United States Patent
Wang et al.

(10) Patent No.: US 11,504,731 B2
(45) Date of Patent: Nov. 22, 2022

(54) METHOD FOR AUTOMATIC GLUE-SPRAYING OF STRINGER AND INSPECTION OF GLUE-SPRAYING QUALITY

(71) Applicant: NANJING UNIVERSITY OF AERONAUTICS AND ASTRONAUTICS, Jiangsu (CN)

(72) Inventors: Jun Wang, Jiangsu (CN); Jun Zhou, Jiangsu (CN); Yuanpeng Liu, Jiangsu (CN); Qian Xie, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 15 days.

(21) Appl. No.: 17/169,538

(22) Filed: Feb. 7, 2021

(65) Prior Publication Data
US 2021/0331191 A1 Oct. 28, 2021

(30) Foreign Application Priority Data
Apr. 22, 2020 (CN) .......................... 202010321066.6

(51) Int. Cl.
*G06K 9/00* (2022.01)
*B05B 12/08* (2006.01)
(Continued)

(52) U.S. Cl.
CPC .......... *B05B 12/084* (2013.01); *B05B 12/004* (2013.01); *G05B 19/4097* (2013.01);
(Continued)

(58) Field of Classification Search
None
See application file for complete search history.

(56) References Cited

U.S. PATENT DOCUMENTS

| 2010/0038024 A1 | 2/2010 | Brandt |
| 2020/0089236 A1* | 3/2020 | Doemling ............. G06F 9/3891 |

(Continued)

FOREIGN PATENT DOCUMENTS

| CN | 108982546 A | 12/2018 |
| CN | 109849351 A | 6/2019 |

(Continued)

*Primary Examiner* — Sean M Conner

(57) ABSTRACT

A method for automatic glue-spraying of stringers and inspection of glue-spraying quality based on measured data. Three-dimensional (3D) point cloud data of a stringer-skin assembly is collected by 3D laser scanner, and then processed by denoising and sampling. Feature points of an intersection line of a site to be glued of the stringer-skin assembly are extracted by K-means clustering method based on Gaussian mapping, and a minimum spanning tree is constructed based on a set of the extracted feature points. A connected region is established to obtain an initial feature intersection line of the string-skin assembly, which is optimized by random sample consensus algorithm to remove redundant small branch structures to obtain the actual glue-spraying trajectory. The quality of the glue sprayed on the stringer-skin assembly is inspected by line laser to determine positions of the defects, which are then subjected to secondary glue-spraying.

4 Claims, 2 Drawing Sheets

(51) Int. Cl.
*G06T 7/521* (2017.01)
*G06T 7/73* (2017.01)
*B05B 12/00* (2018.01)
*G05B 19/4097* (2006.01)
*G06T 7/00* (2017.01)
*G06V 10/40* (2022.01)

(52) U.S. Cl.
CPC ............ *G06T 7/0004* (2013.01); *G06T 7/521* (2017.01); *G06T 7/73* (2017.01); *G06V 10/40* (2022.01); *G05B 2219/45013* (2013.01); *G05B 2219/45238* (2013.01); *G06T 2207/10028* (2013.01); *G06T 2207/30108* (2013.01)

(56) References Cited

U.S. PATENT DOCUMENTS

2020/0096628 A1\* 3/2020 Tanaka .................... G01S 7/411
2020/0210305 A1\* 7/2020 Hedge .................... F01D 17/02

FOREIGN PATENT DOCUMENTS

| CN | 110220476 A | 9/2019 |
| CN | 110927172 A | 3/2020 |
| CN | 110976212 A | 4/2020 |

\* cited by examiner

METHOD FOR AUTOMATIC GLUE-SPRAYING OF STRINGER AND INSPECTION OF GLUE-SPRAYING QUALITY

CROSS-REFERENCE TO RELATED APPLICATIONS

This application claims the benefit of priority from Chinese Patent Application No. 202010321066.6, filed on Apr. 22, 2020. The content of the aforementioned application, including any intervening amendments thereto, is incorporated herein by reference in its entirety.

TECHNICAL FIELD

This application relates to glue-spraying techniques, and more particularly to a method for automatic glue-spraying of a stringer and inspection of glue-spraying quality.

BACKGROUND

The development of the aviation industry in China brings higher and higher requirements for the design precision of new aircrafts. As an important load-bearing assembly in the digital design and manufacturing of aircrafts, the aircraft panel is expected to have characteristics of small weight, high efficiency and good universality. Generally, the aircraft panel is composed of the skin and the stringer, and these two components are considered vital in the manufacturing of an aircraft since they are closely associated with the bearing capacity, stability (buckling performance and pressure loss) and structural efficiency of the panel. Therefore, a stable connection between the stringer and the skin is considered as the basis for maintaining the stability of the aircraft structure. At present, the stringer and the skin are generally connected by gluing. However, in the traditional manufacturing process, it is often required manually complete the gluing between the stringer and the skin and the inspection of the adhesive quality. Therefore, the traditional gluing process is time and labor-consuming. Specifically, on the one hand, there are differences in the sizes of the skins, and when the gluing is performed between a large skin and a stringer, an offset may occur to the glue-spraying trajectory, which will cause a deviation in the gluing sites of the stringer and the skin. On the other hand, after the manual glue-spraying is completed, manual inspections are also needed to determine whether the adhesive is intact, whether the sites to be coated on the skin are all coated with an adhesive, and whether the quality and size of the adhesive meet the related standards. In view of the above, how to quickly and accurately extract the glue-spraying trajectory and perform the automatic monitoring of glue quality is the key to achieve the automatic gluing.

Recently, due to the rapid development of high-precision three-dimensional scanning equipment, the three-dimensional (3D) data processing technology based on measured point clouds also achieves a great progress. In view of this, a technique for accurately performing gluing between the skin and stringer based on measured data is designed herein, in which the high-precision 3D measured data is used to accurately and quickly extract the glue-spraying trajectory and inspect the gluing quality, enabling the automatic and accurate gluing between the skin and the stringer and the inspection of the glue-spraying quality.

SUMMARY

An object of this disclosure is to provide a method for automatic glue-spraying of a stringer and inspection of glue-spraying quality to overcome the defects in the prior art.

Technical solutions of this disclosure are described as follows.

This disclosure provides a method for automatic glue-spraying of a stringer and inspection of glue-spraying quality, comprising:

(1) collecting data of a 3D point cloud of an assembly of a stringer and a skin and pre-processing the collected data of the 3D point cloud prior to glue-spraying;

(2) extracting feature points of an intersection line of a site to be glued of the stringer and the skin; building a minimum spanning tree; and connecting the feature points to obtain an initial feature intersection line between the stringer and the skin;

(3) optimizing the initial feature intersection line, and transforming the optimized feature intersection line to a coordinate system of an end effector of a glue-spraying robot to obtain an actual glue-spraying trajectory; and (4) after the glue-spraying, collecting point cloud data of a glue sprayed on the stringer and the skin; calculating size information of the glue and determining a position of defects on the glue based on the point cloud data of the glue; and performing secondary glue-spraying on the defects of the glue.

In an embodiment, in step (1), the data of the 3D point cloud is collected using a 3D laser scanner, and the collected data of the 3D point cloud comprises position data of the site to be glued of the stringer and the skin.

In an embodiment, step (2) comprises:

(2.1) extracting the feature points of the intersection line of the site to be glued of the stringer and the skin based on extraction of feature points from a point cloud data model; and (2.2) building the minimum spanning tree based on the extracted feature points; and connecting the feature points according to the minimum spanning tree.

In an embodiment, in step (2.1), the feature points of the intersection line of the site to be glued of the stringer and the skin are extracted by a K-means clustering method based on Gaussian mapping through steps of:

randomly selecting a 3D point in the 3D point cloud as a target point;

performing a K-nearest neighbor search on the target point;

subjecting a unit normal vector of a triangle set composed of the target point and its neighbor points to Gaussian mapping;

selecting silhouette coefficient as a clustering validity index to determine an optimal number of clusters; and obtaining the feature points in the 3D point cloud model according to clustering distribution of different patches; wherein the feature points in the 3D point cloud model are the feature points of the intersection line of the site to be glued of the stringer and the skin.

In an embodiment, step (3) comprises:

(3.1) optimizing the initial feature intersection line between the stringer and the skin to remove redundant small branch structures; and (3.2) transforming the optimized feature intersection line to the coordinate system of the end effector of the glue-spraying robot to obtain the actual glue-spraying trajectory according to a determined calibration relationship.

In an embodiment, in step (3.1), the redundant small branch structures in the initial feature intersection line are removed through a random sample consensus algorithm.

In an embodiment, step (4) comprises:

collecting point cloud data of the glue-sprayed assembly of the stringer and the skin, wherein the collected point cloud data comprises data of structures of the stringer and skin and the glue sprayed thereon;

subjecting the point cloud data of the stringer and the skin to straight-line fitting using the random sample consensus algorithm to obtain a fitting straight line;

projecting the point cloud data of the glue sprayed on the stringer and the skin onto the fitting straight line by orthogonal projection to calculate the size information of the glue;

determining positions of defects on the glue according to the size information of the glue and the position information obtained by line laser scanning; and performing secondary glue-spraying on the defects of the glue.

Compared to the prior art, this disclosure has the following beneficial effects.

In the automatic glue-spraying method provided herein for stringers based on measured data, a three-dimensional point cloud data model is employed to obtain a spraying trajectory, and then the quality of the glue on the stringer and skin assembly is inspected by line laser, so as to repair the defects in the glue. As a consequence, the method provided herein solves the problem in the prior art that it is difficult to automatically apply glue on stringers, and improves the glue-spraying efficiency, achieving a stable and efficient glue-spraying for stringers based on measured data.

BRIEF DESCRIPTION OF THE DRAWINGS

This disclosure will be further described below with reference to the accompanying drawings. Obviously, depicted in the drawings are merely some embodiments of this disclosure, and other embodiments made by those skilled in the art based on the content of the disclosure without sparing any creative effort should fall within the scope of the disclosure.

DETAILED DESCRIPTION OF EMBODIMENTS

This disclosure will be further described in detail below with reference to the accompanying drawings and embodiments. It is obvious that provided below are merely some embodiments of this disclosure, which are not intended to limit the disclosure. Other embodiments made by those skilled in the art based on the content disclosed herein without sparing any creative effort should fall within the scope of the disclosure.

Figure 1:
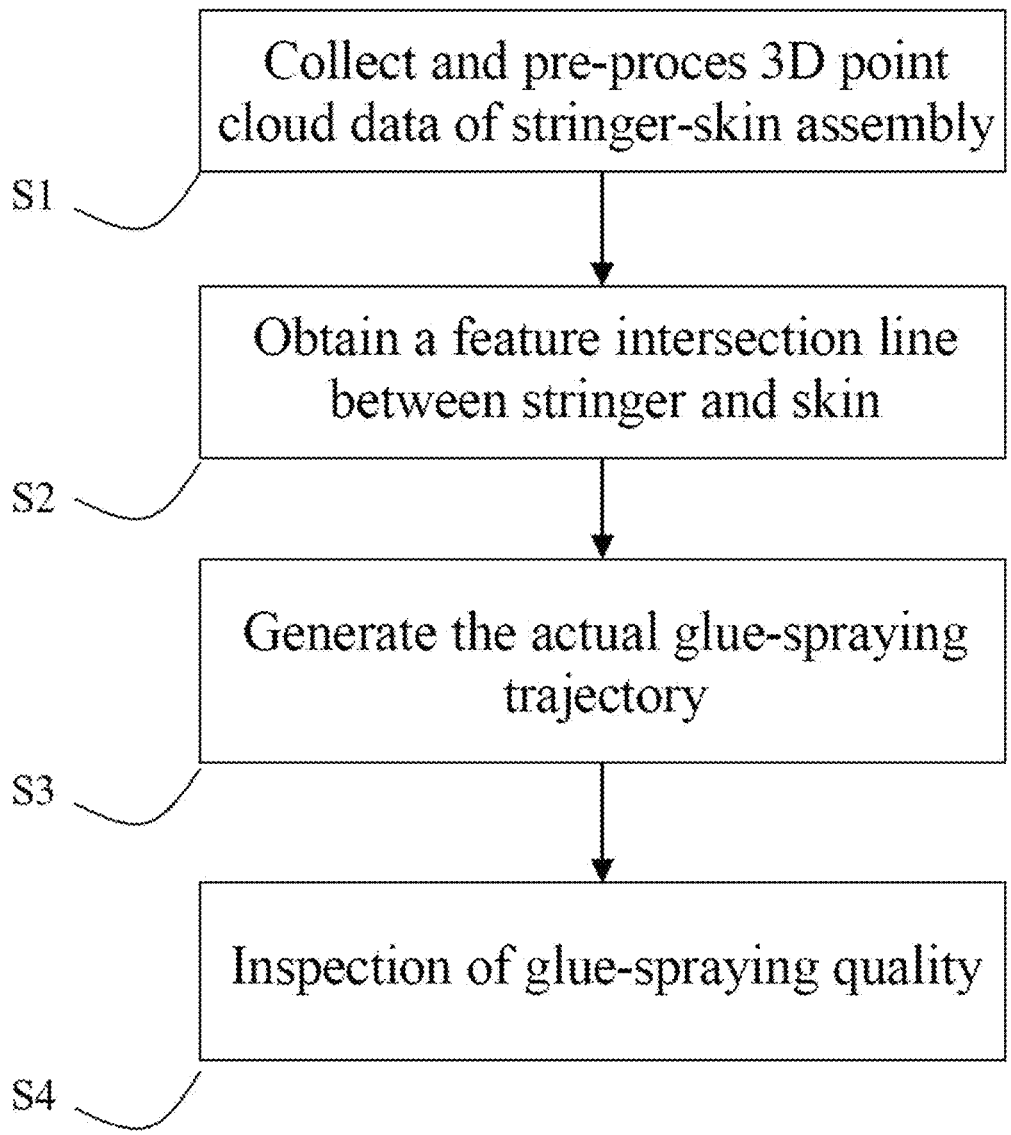
FIG. 1 is a flow chart of a method for automatic glue-spraying of a stringer and inspection of glue-spraying quality based on measured data according to an embodiment of this disclosure.
Figure 2:
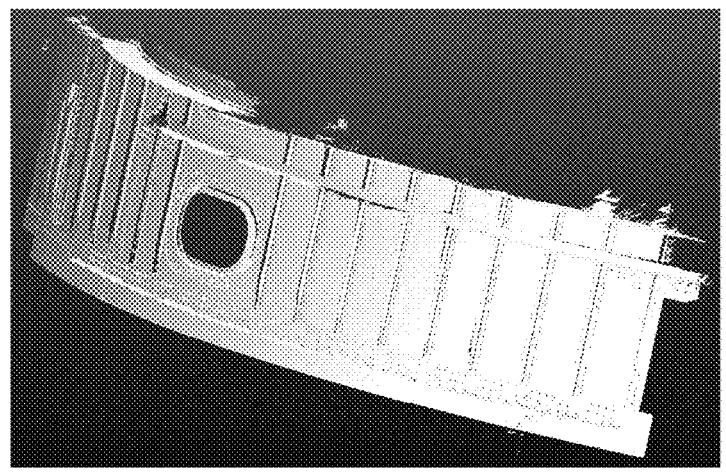
FIG. 2 schematically shows three-dimensional point cloud data of a stringer and skin assembly according to an embodiment of this disclosure.
Figure 3:
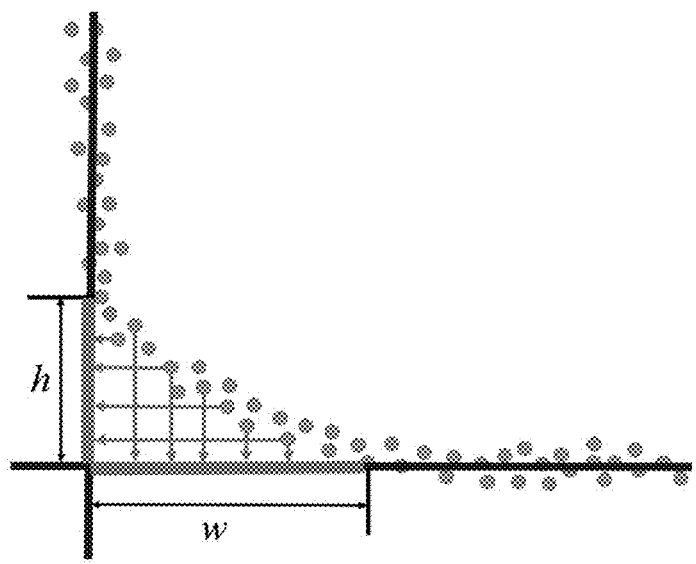
FIG. 3 schematically illustrates a projection principle of point cloud of the glue sprayed on the stringer and skin assembly according to an embodiment of this disclosure.
Figure 4:
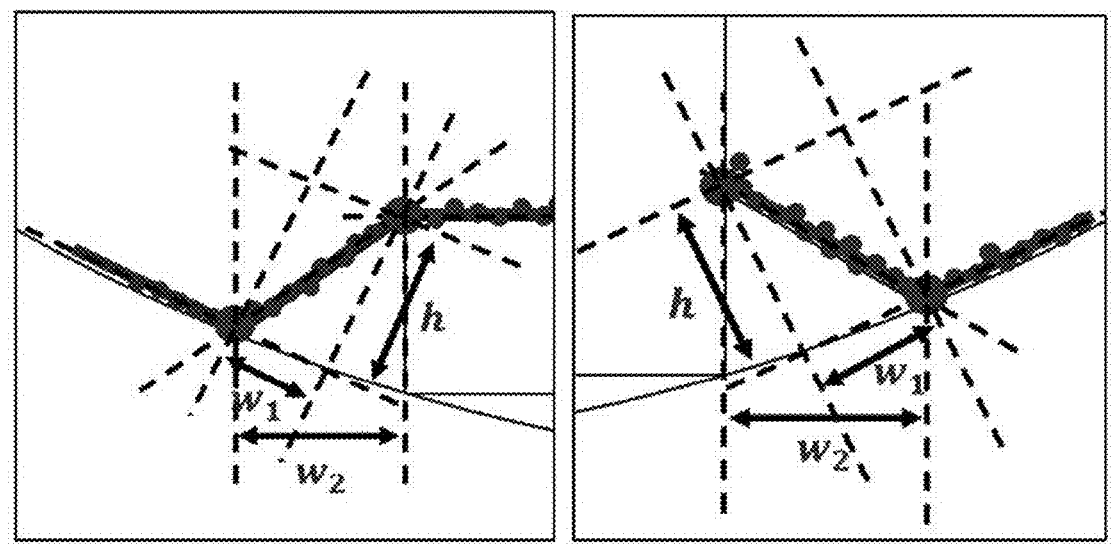
FIG. 4 schematically shows a calculation principle of size information of the glue sprayed on the stringer and skin assembly according to an embodiment of this disclosure.

Referring to FIGS. 1-4, this disclosure provides a method for automatic glue-spraying of a stringer and inspection of glue-spraying quality. The process of the method is schematically shown in FIG. 1, and is specifically described as follows.

(1) Data Collection and Pre-Processing

Three-dimensional point cloud data of a stringer and skin assembly is collected using a 3D laser scanner, and then the collected 3D point cloud data is subjected to denoising and sampling.

(2) Extraction of Feature Intersection Line Between Stringer and Skin

Feature points of the intersection line of the site to be glued of the stringer and skin are extracted by a K-means clustering method based on Gaussian mapping and then used to build a minimum spanning tree. A connected region is established through the minimum spanning tree to obtain the feature intersection line.

(3) Generation of Actual Glue-Spraying Trajectory

The feature intersection line is optimized and then transformed to a coordinate system of an end effector of a glue-spraying robot to obtain the glue-spraying trajectory.

(4) Inspection of Glue-Spraying Quality

Point cloud data of the glue sprayed on the stringer and skin assembly is collected by line laser and then used to calculate the size information of the glue at each position, so as to determine the position of the defects. Secondary glue-spraying is performed on the above defects.

In step (1), the 3D point cloud data of the stringer and skin assembly is collected by a 3D laser scanner, and then subjected to denoising and sampling.

In step (2), the feature intersection line between stringer and skin is extracted as follows.

(2.1) The feature points of the intersection line of the site to be glued of the stringer and the skin are extracted using a K-Means clustering method based on Gaussian mapping.

The step (2.1) is specifically performed as follows.

(2.1.1) A 3D point in the 3D point cloud is selected as a target point, and then a K-nearest neighbor search is performed on the target point.

(2.1.2) A unit normal vector of a triangle set composed of the target point and its neighbor points is subjected to Gaussian mapping.

(2.1.3) The silhouette coefficient is selected as a clustering validity index to determine an optimal number of clusters.

(2.1.4) The feature points in the 3D point cloud model are obtained as the feature points of the intersection line of the site to be glued of the stringer and the skin according to clustering distribution of different patches.

(2.2) The minimum spanning tree is built based on a set of the extracted feature points, and then the feature points are connected according to the minimum spanning tree to obtain an initial feature intersection line.

In step (3), the generation of the actual glue-spraying trajectory is specifically described as follows.

(3.1) The initial feature intersection line between the stringer and the skin is optimized through a random sample consensus algorithm to remove the redundant small branch structures.

(3.2) The optimized feature intersection line is transformed to the coordinate system of the end effector of the glue-spraying robot to obtain the actual glue-spraying trajectory according to a determined calibration relationship.

In step (4), the glue-spraying quality is inspected as follows.

(4.1) The point cloud data of the glue-sprayed stringer and skin assembly is collected by two-dimensional line laser, where the point cloud data includes data of the structure of the stringer and skin assembly and data of the glue sprayed thereon.

(4.2) The point cloud data of the stringer and skin assembly is subjected to straight-line fitting using the random sample consensus algorithm to obtain a fitting straight line, onto which the point cloud data of the glue sprayed on the stringer and skin assembly is projected by orthogonal projection to calculate the size information of the glue.

(4.3) Positions of defects on the glue are determined according to the size information of the glue and the position information obtained by line laser scanning, and the defects on the glue are subjected to secondary glue-spraying.

Specifically, the method provided herein for automatic glue-spraying of a stringer and inspection of glue-spraying quality has the following advantages.

In the automatic glue-spraying method provided herein for stringers based on measured data, a three-dimensional point cloud data model is employed to obtain a spraying trajectory, and then the quality of the glue on the stringer and skin assembly is inspected by line laser, so as to repair the defects in the glue. As a consequence, the method provided herein solves the problem in the prior art that it is difficult to automatically apply glue on stringers, and improves the glue-spraying efficiency, achieving a stable and efficient glue-spraying for stringers based on measured data.

Various aspects of the disclosure are described herein with reference to the accompanying drawings, in which some embodiments of the disclosure are shown. The embodiments are not necessarily defined to include all aspects of the invention. It should be understood that the various concepts and embodiments introduced above, as well as those described in more detail below, can be implemented in any one of many optional ways. In addition, some aspects disclosed herein can be implemented alone or in any appropriate combination with other aspects disclosed in the disclosure.

Described above are preferred embodiments of the disclosure, which are merely illustrative of the disclosure and are not intended to limit the disclosure. Obviously, any changes, modifications and replacements made by those of ordinary skill in the art without departing from the spirit of the disclosure should fall within the scope of the disclosure defined by the appended claims.

What is claimed is:

1. A method for automatic glue-spraying of a stringer and inspection of glue-spraying quality, comprising:
   (1) collecting data of a 3D point cloud of an assembly of a stringer and a skin and pre- processing the collected data of the 3D point cloud prior to glue-spraying;
   (2) extracting feature points of an intersection line of a site to be glued of the stringer and the skin; building a minimum spanning tree; and connecting the feature points to obtain an initial feature intersection line between the stringer and the skin;
   wherein step (2) comprises:
   (2.1) extracting the feature points of the intersection line of the site to be glued of the stringer and the skin based on extraction of feature points from a point cloud data model;
   wherein in step (2.1), the feature points of the intersection line of the site to be glued of the stringer and the skin are extracted by a K-means clustering method based on Gaussian mapping through steps of:
   randomly selecting a 3D point in the 3D point cloud as a target point
   performing a K-nearest neighbor search on the target point
   subjecting a unit normal vector of a triangle set composed of the target point and its neighbor points to Gaussian mapping;
   selecting silhouette coefficient as a clustering validity index to determine an optimal number of clusters; and
   obtaining the feature points in the 3D point cloud model as the feature points of the intersection line of the site to be glued of the stringer and the skin according to clustering distribution of different patches; and
   (2.2) building the minimum spanning tree based on the extracted feature points; and connecting the feature points according to the minimum spanning tree;
   (3) optimizing the initial feature intersection line, and transforming the optimized feature intersection line to a coordinate system of an end effector of a glue-spraying robot to obtain an actual glue-spraying trajectory;
   wherein step (3) comprises:
   (3.1) optimizing the initial feature intersection line between the stringer and the skin to remove redundant small branch structures; and
   (3.2) transforming the optimized feature intersection line to the coordinate system of the end effector of the glue-spraying robot to obtain the actual glue-spraying trajectory according to a determined calibration relationship;
   (4) after the glue-spraying, collecting point cloud data of a glue sprayed on the stringer and the skin; calculating size information of the glue and determining a position of defects on the glue based on the point cloud data of the glue; and performing secondary glue-spraying on the defects of the glue.

2. The method of claim 1, wherein in step (1), the data of the 3D point cloud is collected using a 3D laser scanner, and the collected data of the 3D point cloud comprises position data of the site to be glued of the stringer and the skin.

3. The method of claim 1, wherein in step (3.1), the redundant small branch structures in the initial feature intersection line are removed through a random sample consensus algorithm.

4. The method of claim 1, wherein step (4) comprises:
   collecting point cloud data of the stringer and the skin after glue-spraying, wherein the collected point cloud data comprises data of structures of the stringer and skin and the glue sprayed thereon;
   subjecting the point cloud data of the stringer and the skin to straight-line fitting using the random sample consensus algorithm to obtain a fitting straight line;
   projecting the point cloud data of the glue sprayed on the stringer and the skin onto the fitting straight line by orthogonal projection to calculate the size information of the glue;
   determining positions of defects on the glue according to the size information of the glue and the position information obtained by line laser scanning; and
   performing secondary glue-spraying on the defects of the glue.

* * * * *